United States Patent
Paxton et al.

(10) Patent No.: US 9,497,932 B1
(45) Date of Patent: *Nov. 22, 2016

(54) CANINE WOUND BOOT

(76) Inventors: Stephen E. Paxton, Brainerd, MN (US); Lisa M. Lugo-Paxton, Brainerd, MN (US)

(*) Notice: Subject to any disclaimer, the term of this patent is extended or adjusted under 35 U.S.C. 154(b) by 737 days.

This patent is subject to a terminal disclaimer.

(21) Appl. No.: 13/396,595

(22) Filed: Feb. 14, 2012

Related U.S. Application Data

(63) Continuation of application No. 12/719,847, filed on Mar. 8, 2010, now Pat. No. 8,113,152, and a continuation-in-part of application No. 10/980,085, filed on Nov. 2, 2004, now Pat. No. 7,971,557.

(60) Provisional application No. 61/158,334, filed on Mar. 6, 2009, provisional application No. 60/517,112, filed on Nov. 3, 2003.

(51) Int. Cl.
*A01K 13/00* (2006.01)

(52) U.S. Cl.
CPC .......... *A01K 13/006* (2013.01); *A01K 13/007* (2013.01)

(58) Field of Classification Search
CPC .................. A01K 13/006; A01K 13/007
USPC ......... 119/850, 853; 36/71, 89, 90, 111, 7.4, 36/7.3, 7.1 R
See application file for complete search history.

(56) References Cited

U.S. PATENT DOCUMENTS

| | | | | |
|---|---|---|---|---|
| 2,651,853 A * | 9/1953 | Lewis | ................ | A01K 13/007 36/111 |
| 5,211,672 A * | 5/1993 | Andujar | ................ | A43B 5/00 36/106 |
| 5,385,036 A * | 1/1995 | Spillane | ................ | A43B 1/04 2/16 |
| 5,408,812 A * | 4/1995 | Stark | ................ | A01L 9/00 119/850 |
| 5,452,685 A * | 9/1995 | Thomas | ................ | A01K 13/007 119/850 |
| 5,490,337 A * | 2/1996 | Zerbinati | ................ | A43B 5/0433 36/117.7 |
| 5,495,828 A * | 3/1996 | Solomon | ................ | A01L 9/00 119/850 |
| 5,813,144 A * | 9/1998 | Prengler | ................ | A43B 5/00 36/138 |
| 5,983,526 A * | 11/1999 | Pawlik | ................ | A43B 3/18 36/51 |
| 6,526,920 B1 * | 3/2003 | Griffin | ................ | A01K 13/007 119/850 |
| 7,971,557 B2 * | 7/2011 | Paxton | ................ | A01K 13/006 119/850 |
| 8,176,880 B2 * | 5/2012 | Hurwitz | ................ | A01K 13/007 119/850 |
| 2003/0115777 A1 * | 6/2003 | Hall | ................ | A43B 3/0031 36/117.6 |
| 2009/0012490 A1 * | 1/2009 | Winqvist | ................ | A61F 13/5633 604/385.03 |

* cited by examiner

*Primary Examiner* — Valentina Xavier
(74) *Attorney, Agent, or Firm* — Albert W. Watkins

(57) ABSTRACT

A canine wound boot is fabricated using a breathable substrate having two layers of generally open weave and a fibrous material spacing and bonding the two layers together. Onto the substrate, various friction pads, wear pads, one or more straps, and strategically located cushions are attached. Specially configured slits ensure that a wide range of leg sizes relative to paw sizes may be accommodated, while easing application of the boot and eliminating any risk of bunching. Elastic material serves as a gusset in the boot which expands to cover a bandage or cast.

15 Claims, 6 Drawing Sheets

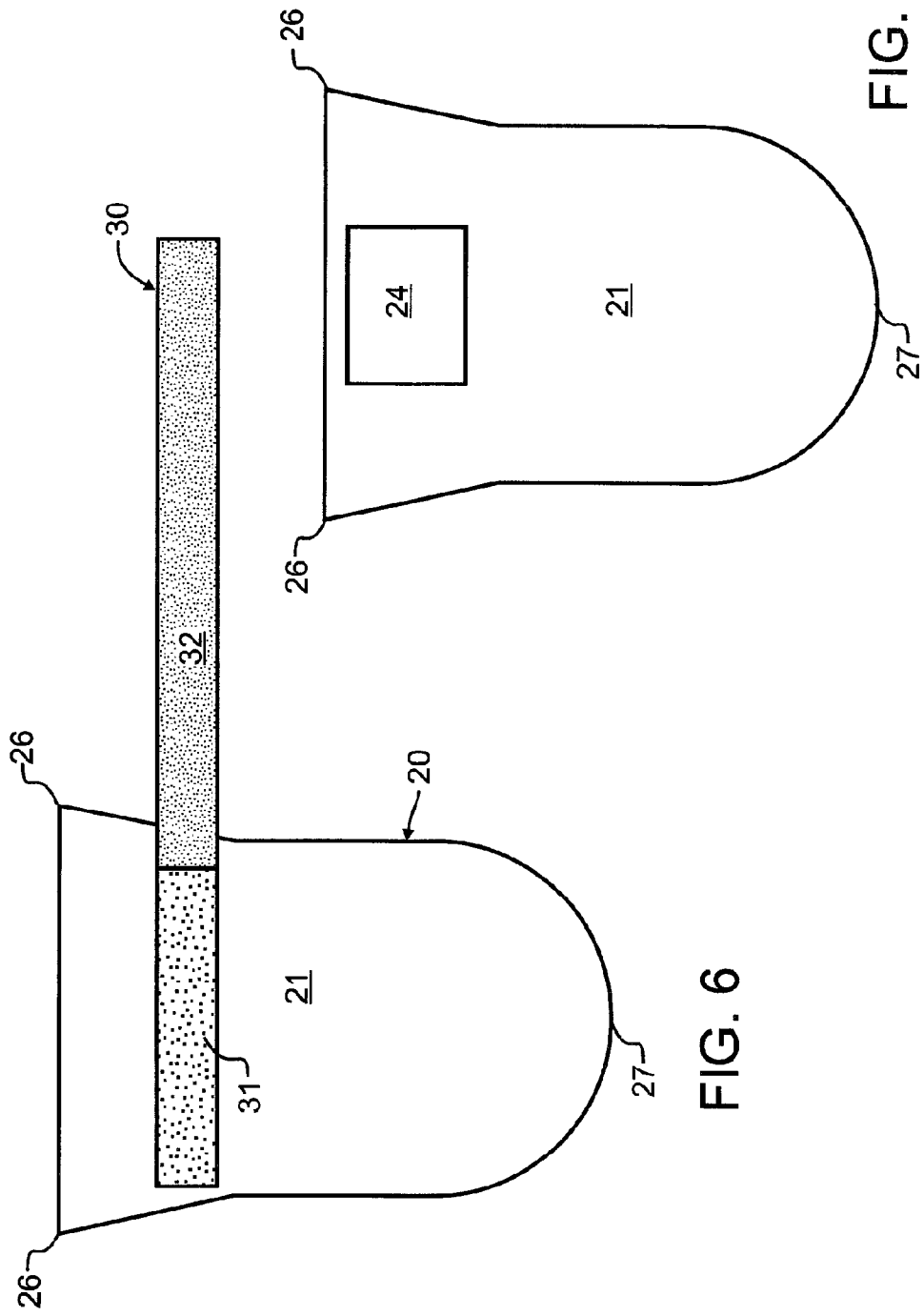

CANINE WOUND BOOT

CROSS REFERENCE TO RELATED APPLICATIONS

This application is a continuation of previously co-pending U.S. patent application Ser. No. 12/719,847 filed Mar. 8, 2012 and now U.S. Pat. No. 8,113,152, which in turn claims priority to provisional application Ser. No. 61/158,334 filed Mar. 6, 2009, and is a continuation in part of previously co-pending U.S. patent application Ser. No. 10/980,085 filed Nov. 2, 2004 and now U.S. Pat. No. 7,971,557 and naming the present inventors, which in turn claims priority to U.S. provisional application Ser. No. 60/517,112 filed Nov. 3, 2003, the contents of each which are incorporated herein by reference in entirety.

BACKGROUND OF THE INVENTION

1. Field of the Invention

This invention pertains generally to the field of animal husbandry, and more particularly to protective canine boots.

2. Description of the Related Art

Dogs have long been known as "man's best friend". These animals serve very diverse functions, providing companionship, guarding, towing, hunting, and even sensory conversion, such as a seeing eye-dog, a hearing-assist dog, and even a police or military dog. Regardless of the relationship between person and dog, at various times, and for many diverse reasons, it may be highly desirable for the dog owner to place boots upon the dog's paws. For example, in inclement weather, a person may not wish to try to clean a dog's paws after the dog has been outside. Boots that may be placed and then readily removed may be much easier to use than what might be required to thoroughly clean the dog's feet. In other instances, a dog may have injured one or more paws, and so may not have the usual toughness. In such case, a suitable boot may help to protect the affected paw until sufficient healing has occurred to no longer require the boot. In other cases, the dog's pads may be inadequate for traversing the ground when temperatures are particularly severe, such as in colder climates or with dogs that are not adapted to the cold, or conversely in extremely hot climates where the ground surface may be scorching. Racing and sled dogs may be exposed to a particularly harsh course or environment, and so may also need special protection. Boots can be used to prevent snow from getting up between the pads of the foot, freezing, abrading the soft tissue, and thereby producing a lame dog.

A number of artisans have recognized one or more of the foregoing needs, and so have designed various dog boots. One such patent which exemplifies these known boots is U.S. Pat. No. 6,526,920 by Griffin, entitled "Dog boot for hunting and other outdoor activities," the teachings which are incorporated herein by reference. This patent describes dog boots having a zipper and dual hook-and-loop leg fasteners with loops for tightening, and a non-skid sole. Additional patents that offer useful teachings and insights are incorporated by reference, including U.S. Pat. Des. No. 387,511 by Caditz; U.S. Pat. No. 5,495,828 by Solomon et al; U.S. Pat. No. 5,408,812 by Stark; U.S. Pat. No. 6,186,097 by Brockmann et al; Des. 379,251 by Mezey; U.S. Pat. No. 5,148,657 by Stafford et al; U.S. Pat. No. 5,452,685 by Thomas; U.S. Pat. No. 2,064,566 by Richman; U.S. Pat. No. 2,424,172 by Huddleston; U.S. Pat. No. 2,651,853 by Lewis; U.S. Pat. No. 3,762,073 by Cantales; U.S. Pat. Nos. 4,457,261 and 4,543,911 by Marshall; and U.S. Pat. No. 6,470,832 by Peacock. In addition to the foregoing patents, Webster's New Universal Unabridged Dictionary, Second Edition copyright 1983, is incorporated herein by reference in entirety for the definitions of words and terms used herein.

However, these prior art boots tend to suffer from several common limitations. As may be recognized, prior art dog boots are often very difficult to put on the dog's paw. This problem will be intensified by the fact that most dogs will not remain still while a person is trying to put the boot on. Once on, these prior art boots do not stay on well. Many will simply spin about, potentially causing much discomfort or harm to the dog. Others will slide off as the dog walks or runs, much like loose socks coming off of a person walking on carpet. This phenomenon is quite significant, since the boot must be designed to be of non-slip material, or the dog will sprawl on finished wood, icy or other relatively slippery surfaces. Yet, the boot must also preferentially stay on the dog's paw, rather than slide with respect thereto, even when the booted dog is traversing terrain having good traction. Simply applying more force about the dog's leg to keep the boot on has proven to be totally unsatisfactory, since circulation within the leg may become limited or disrupted. Unintended bunching of the boot top can be harder to detect, and can also restrict circulation. Yet, different dogs will have significantly different proportions between pad size and leg diameter, meaning that the boot must be very adjustable to accommodate different dog breeds and sizes. Finally, complex boots such as are also illustrated in the prior art are not only more difficult to put on the dog, but they are also much more expensive to produce, which is also undesirable.

SUMMARY OF THE INVENTION

In a first manifestation, the invention is a canine wound boot, suitable for insertion and removal of a dog's leg and paw and providing an operatively protective covering about the dog paw. A generally tubular body member is fabricated from a laminate material having first and second layers spaced apart by fibers bonded at the first layer and extending longitudinally from first layer to second layer and then bonded to the second layer. The generally tubular body member has a closed end and an open end and defines a dog paw region operative to surround the dog's paw and defines a dog leg region operative to surround the dog's leg. A means is provided for contracting the dog leg region. At least one cushion on an interior of the dog leg region protrudes interiorly from the generally tubular body member above and immediately adjacent to the dog paw region by an amount of protrusion when the contracting means is contracted about the dog leg region to produce interference with the dog's paw and thereby prevent the dog leg region from sliding into contact with the dog's paw.

In a second manifestation, the invention is a protective dog boot. A first lamination has a breathable substrate having first and second layers spaced apart by fibers bonded at the first layer and extending longitudinally from first layer to second layer and bonded to the second layer; a first tensioning means on a first surface of the breathable substrate; and a first cushion on a second surface of the first breathable substrate opposed to the first surface and separated from the first tensioning means at least by a thickness of the breathable fabric. A second lamination has a breathable substrate having first and second layers spaced apart by fibers bonded at the first layer and extending longitudinally from first layer to second layer and bonded to the second layer; a waterproof friction pad on a first surface of the second breathable substrate; and a second cushion on a second surface of the second breathable substrate opposed to the first surface and separated from the second tensioning means at least by a thickness of the breathable fabric. The first and second laminations are coupled to form a tube having an open end and a closed end. The first and second lamination cushions are opposed to each other, adjacent the open end, and within a circumference defined by the tensioning means, while only partially circumscribing the circumference so the first lamination cushion does not overlap with the second lamination and so the second lamination cushion does not overlap with the first lamination when the tensioning means is operatively tensioned about a dog leg.

In a third manifestation, the invention is a secure dog boot suitable for insertion and removal of a dog's leg and paw and operatively providing protective covering about the dog paw. An operatively protective covering is fabricated from a laminate material having first and second layers spaced apart by fibers bonded at the first layer and extending longitudinally from first layer to second layer and bonded to the second layer. The operatively protective covering has a closed end and an open end and defines a dog paw region operative to surround the dog's paw, and defines a dog leg region operative to surround the dog's leg. The dog paw region is located adjacent to the closed end and has a ground engaging surface, while the dog leg region is located adjacent to the open end. A means is provided for contracting the dog leg region. At least one interference-producing cushion is located on an interior of the dog leg region protruding interiorly from the operatively protective covering above and immediately adjacent to the dog paw region ground engaging surface, and is operative to produce interference with the dog's paw and thereby resist the dog leg region sliding into contact with the dog's paw.

OBJECTS OF THE INVENTION

Exemplary embodiments of the present invention solve inadequacies of the prior art by providing a breathable fabric substrate onto which friction pads, wear pads, straps, and strategically located cushions are attached. Specially configured slits ensure that a wide range of leg sizes relative to paw sizes may be accommodated, while easing application of the boot and eliminating any risk of bunching during such application. An elastic material serves as a gusset in the boot to facilitate expansion to cover bandages, casts or the like.

A first object of the invention is to provide a dog boot which is readily placed about a dog's paw. A second object of the invention is securement of the boot against slippage, spin or separation with respect to the dog's leg, while simultaneously substantially reducing the risk of circulatory disruption or harm to the dog. Another object of the present invention is to ensure that the boot will readily accommodate a wide range of proportions of paw size to leg diameter. A further object of the invention is to provide a boot which is substantially non-slip with respect to a surface the dog is traversing. Yet another object of the invention is to provide a more readily produced boot which is not unnecessarily complex or expensive to produce, and yet which is durable. An even further object of the invention is that the boot float for water usage. Another object of the invention is that the boot not unduly abrade the dog during use. An additional object of the invention is to cover a dog's injured paw, to prevent the dog from licking or chewing on the wound itself which would otherwise slow or prevent healing. A further object of the invention is that the boot protect against dust, dirt and other contamination of the injury. Another object of the invention is to wick moisture away from a wound, cooling and drying the wound area. This prevents conditions that promote the growth of bacteria which thrive in warm, humid conditions, and so reduces the likelihood of infection.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 6 illustrates the preferred embodiment canine wound boot of FIG. 1 from a top view with the boot laid flat, and the straps fully released.

FIG. 7 illustrates the preferred embodiment canine wound boot of FIG. 6 looking at the top of the boot, with the bottom removed as though inside the boot, from a bottom view.

FIG. 9 illustrates a preferred material used in the fabrication of the preferred embodiment canine wound boot from front plan view, while

DESCRIPTION OF THE PREFERRED EMBODIMENT

Figure 1:
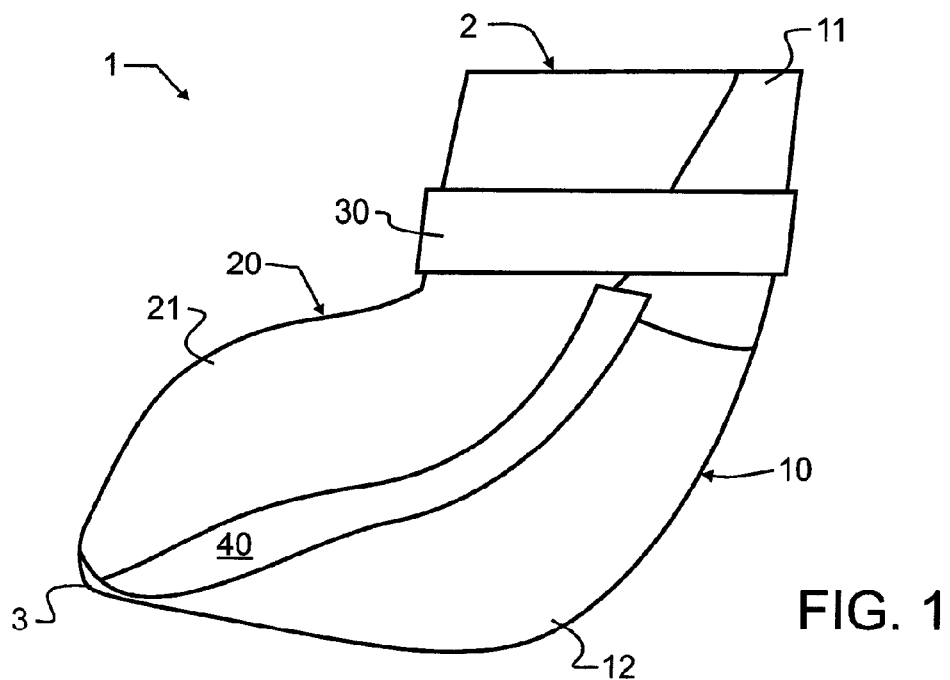
FIG. 1 illustrates a preferred embodiment canine wound boot designed in accord with the teachings of the present invention from a side plan view, in an operative or worn position, without illustrating the dog's leg.

Manifested in the preferred embodiment boot 1, the present invention fulfills the objectives set forth herein above and others. As shown in FIG. 1, boot 1 has the appearance of a flexible or somewhat flaccid tube, with a closed end 3 and an open end 2 distal therefrom. Boot 1 includes a bottom 10 having a non-slip ground-engaging surface 12. In the preferred embodiment boot 1, the rear or bottom of the boot is covered from closed end 3 nearly to strap 30 with this material, though it will be understood that surface 12 may be of any size, and so may comprise a small pad on bottom 10, or may be omitted completely. This non-slip ground-engaging surface 12 will most preferably be a material sold under the brand name "Toughtek," available from Harrison Technologies, Inc. of Gloversville, N.Y., USA, which is a durable material having good traction and pliability even at very low temperatures, and which is non-slip. Ground-engaging surface 12 could be Cordura, other nylon or any material that would have a specific feature such as traction, durability, or waterproofing that the designer elects to incorporate in a boot. However, the non-slip characteristic is most preferable, so as to enable a dog to comfortably stand on relatively slippery surfaces such as finished wood, ice or the like.

Figure 9:
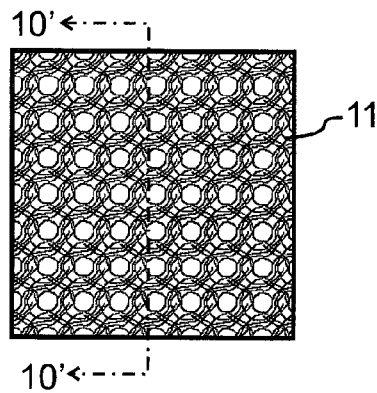
Figure 10:
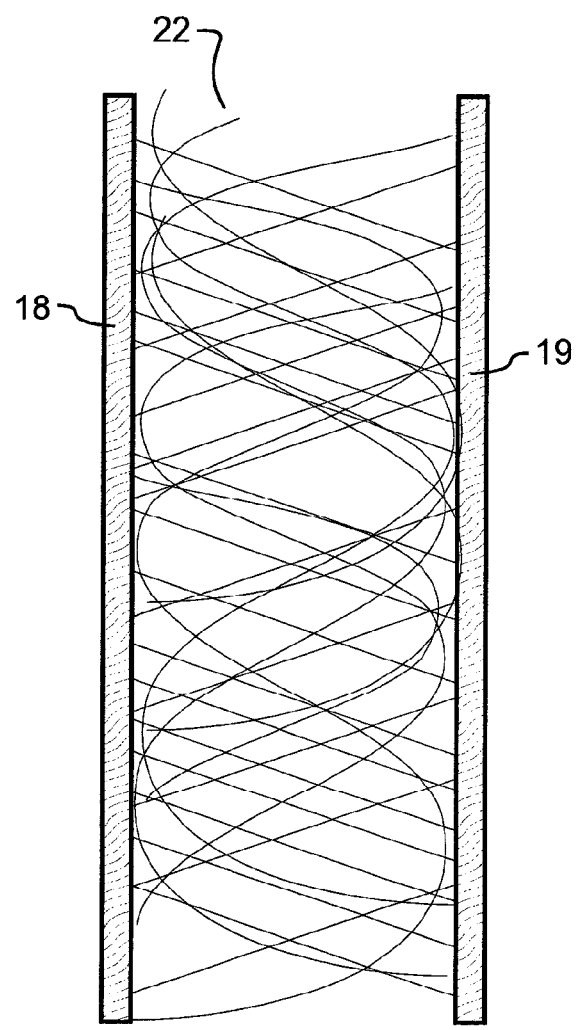
FIG. 10 illustrates the preferred material of FIG. 9 by section taken along section line 10'.

A second layer of material 11 may either extend from or more preferably be parallel to and continue beyond surface 12, or, when surface 12 is completely omitted, instead of surface 12. Material 11 will most preferably be relatively soft, compliant, well ventilated to enhance evaporation of fluids, and resistant to the elements. A material referred to as warp knitted spacer fabric is most preferred, and is illustrated in FIGS. 9 and 10. From FIG. 9, it is apparent that this material is relatively open from one surface to the other, permitting good air flow and evaporation therethrough. FIG. 10 illustrates a sectional view of this preferred warp knitted spacer fabric taken along section line 10' in FIG. 9. Layers 18, 19 are generally elastic and very open material, whether woven fabric or other suitable material. Joining and spacing these two layers 18, 19 are a large plurality of relatively widely spaced fibers 22 bonded at layer 18 and extending longitudinally to and bonded with layer 19. These fibers 22 permit air flow and evaporation, and provide a certain amount of softness and cushion. When layers 18, 19 and fibers 22 are fabricated from suitable compositions such as polymer fibers, reasonable durability and weather resistance may be obtained. In addition, a preferred material 11 may be fabricated from compositions that intrinsically incorporate moisture wicking or may be treated to obtain wicking, and may also be treated or otherwise provide or incorporate anti-bacterial or antimicrobial ingredients.

Figure 4:
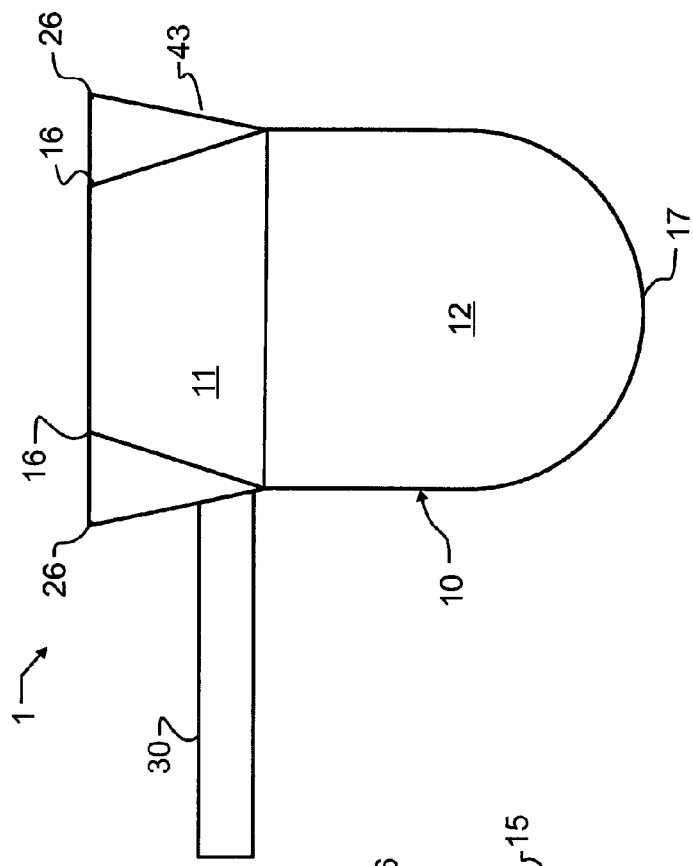
FIG. 4 illustrates the preferred embodiment dog boot of FIG. 1 from a bottom view with the boot laid flat, and the straps fully released.

In the preferred embodiment, material 11 extends from toe 17 to flare terminations 16 (FIG. 5), and is laminated with surface 12 by simple edge stitching (FIG. 4). A similar material will also preferably be used in the fabrication of boot top 20, as material 21. With somewhat larger exposed surface area, the breathable nature of warp knitted spacer fabric or other woven or non-woven fabric or other materials will be very beneficial in many applications. A protective toe patch may be laminated with material 21, but in the preferred embodiment surface 12 wraps slightly up to help guard the toe region. By not using a protective toe patch, ventilation is better immediately adjacent to the toe or claw region. For the same reasons as with a toe patch, waterproofing may also be applied, if desired, but is generally not preferred.

Strap 30 may comprise any suitable tightening means, but in the preferred embodiment a simple hook and loop strap is preferred, which enables very rapid and relatively low force closure. While only a single strap 30 is illustrated, it will be understood that the exact number of straps used is not critical to the proper operation of the invention. Consequently, for some applications it may be desirable to incorporate two or more straps.

Figure 2:
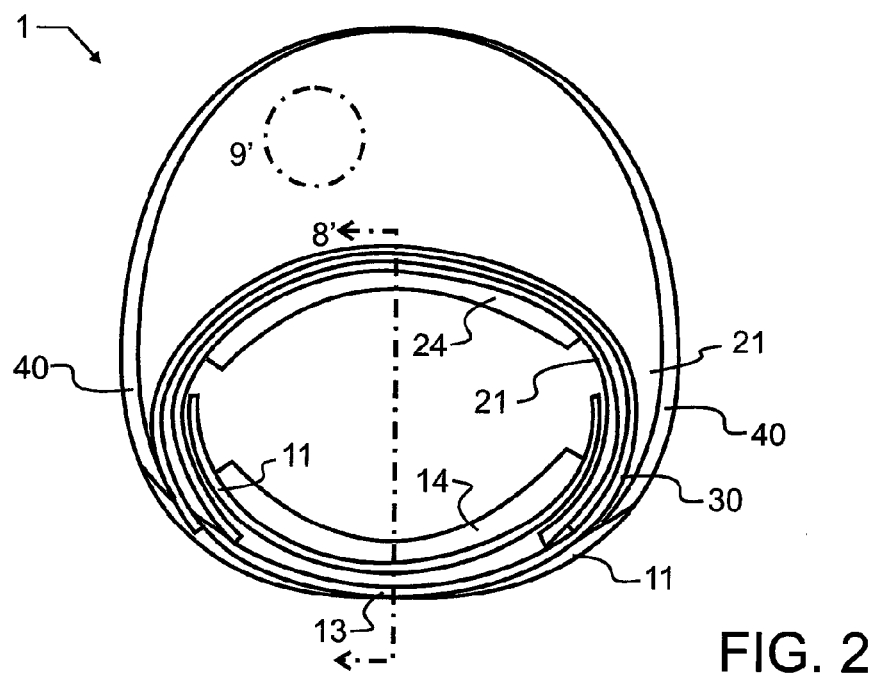
FIG. 2 illustrates the preferred embodiment canine wound boot of FIG. 1 from a top view looking down into the boot.
Figure 3:
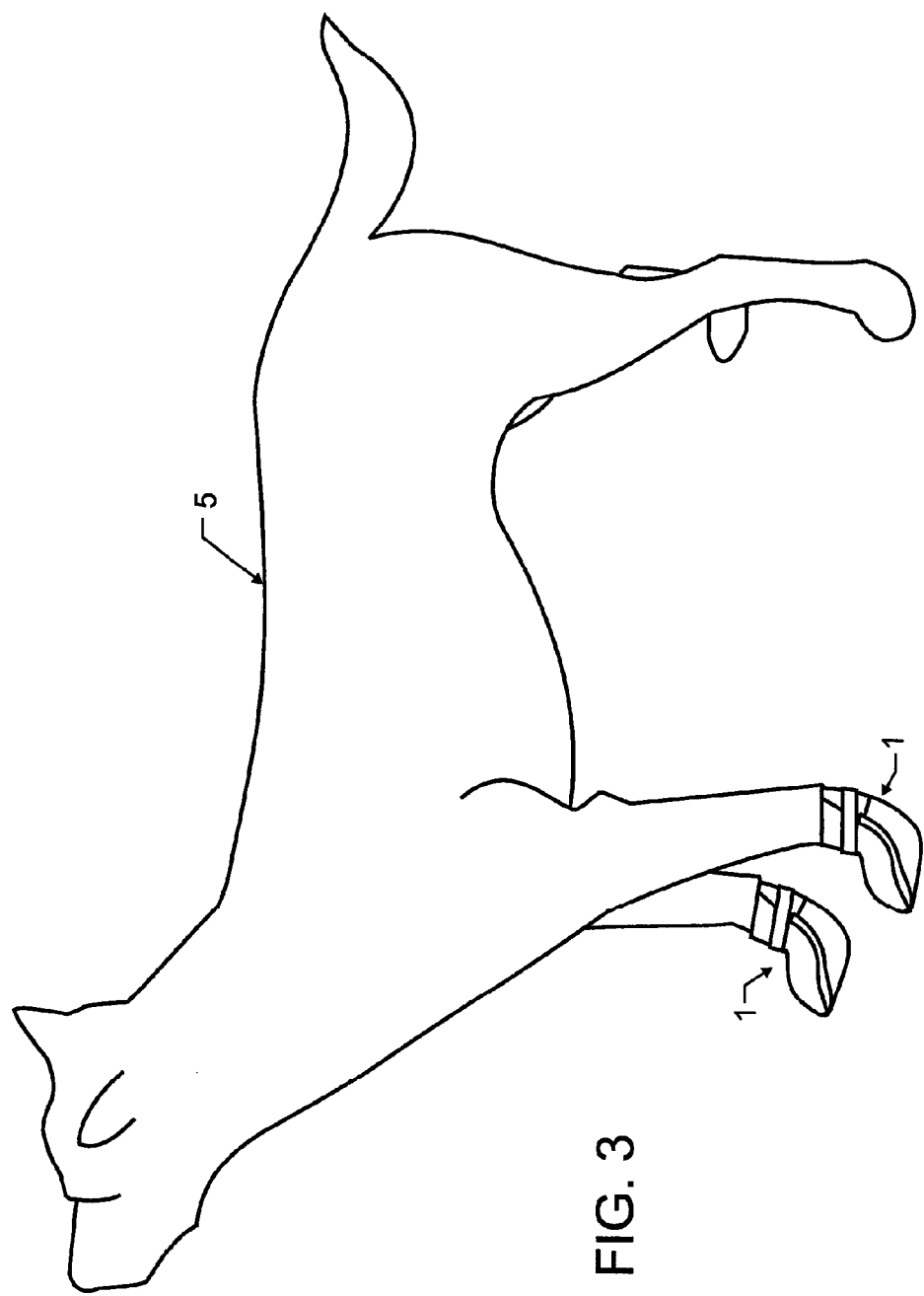
FIG. 3 illustrates the preferred embodiment canine wound boot of FIG. 1 from a side view, as placed upon the front paws of a dog.

FIG. 2 illustrates preferred embodiment boot 1 from a top view, showing the relationship of the various boot components. As illustrated, top and front layer 21 may readily encompass bottom and back layer 11 adjacent the open end 2 of boot 1. Cushioning pads 14, 24 will most preferably extend on an inside of the respective layers 11, 21, within a circumference of contraction created by strap 30 when this strap is tightened about the leg of a dog. In practice, these pads 14, 24 prevent undesirable constriction of a dog's leg, while at the same time forming a relatively high friction contact with the dog's leg, to help to ensure that boot 1 does not slip off. These pads 14, 24 will also ensure a relatively complete surface contact with an otherwise non-cylindrical leg, which also helps to ensure even force distribution about the entire circumference of contraction formed by strap 30.

Most preferably, boot 1 will be dimensioned to cooperate with the intrinsic geometry of a dog paw. In this regard, it is noted that most dog paws are slightly wider at the pad than they are in the leg region slightly above and immediately adjacent the pad. Consequently, with reasonable sizing and placement, cushion 14 will be placed on the leg adjacent the dog's pad, and strap 30 will secure cushion 14 in that position. Such placement ensures that the bulge at the dog's pad will produce interference with cushion 14, thereby preventing cushion 14 from sliding down into the dog's pad region.

Figure 8:
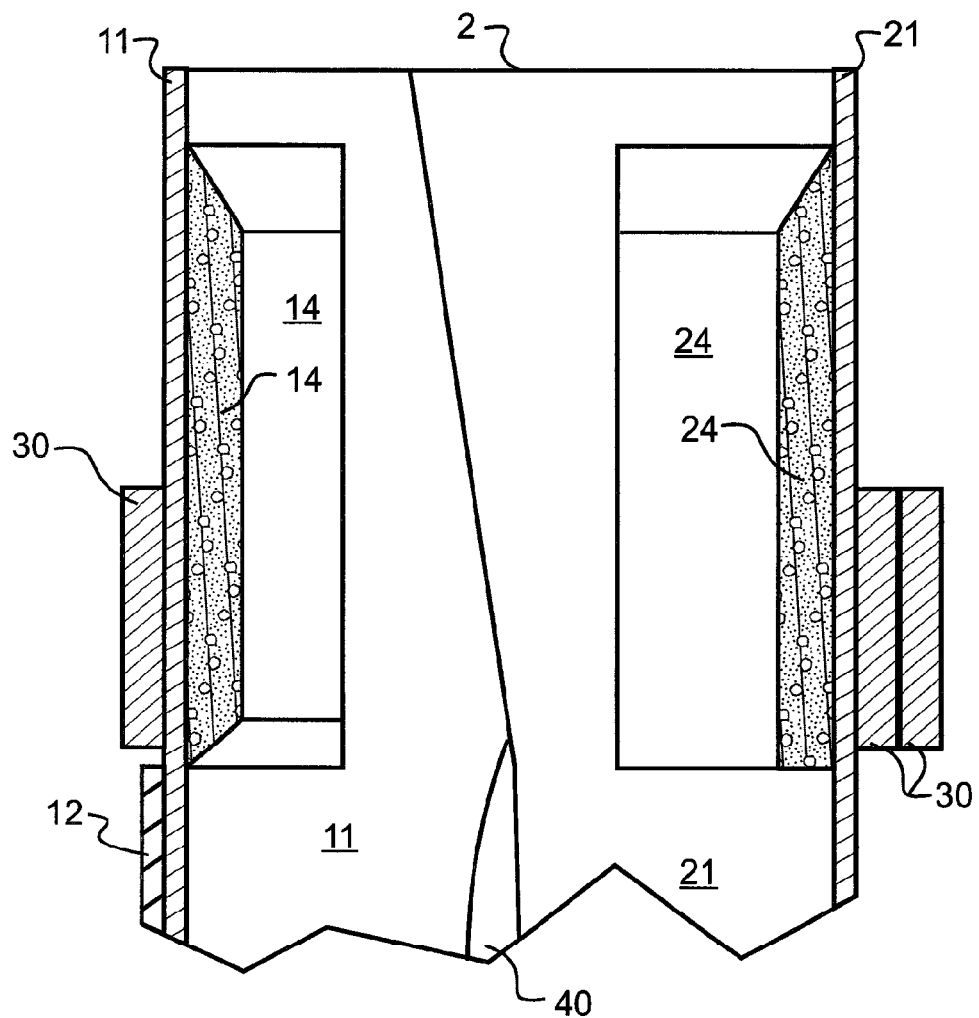
FIG. 8 illustrates the region of the preferred embodiment canine wound boot adjacent open end 2 by enlarged sectional view taken along line 8' shown in FIG. 2.

To further advance this effect, it is quite desirable to cut at least cushioning pad 14 and optionally cut cushioning pad 24 at different angles than perpendicular on edges adjacent open end 2, while keeping these edges perpendicular adjacent the dog's pad, as may be best viewed in the enlarged sectional view of FIG. 8. This permits the dog's paw to pass into boot 1 with less interference, while the sudden perpendicular edge at the base of cushioning pads 14, 24 creates interference.

In the most preferred embodiment, cushioning pads 14, 24 may comprise one or more of a variety of foams and foam rubbers, though closed cell polyurethane and neoprene are preferred, for their combination of low cost, ready availability, water resistance, and high coefficient of friction with many surfaces and materials. This latter coefficient of friction will help to ensure that boot 1 stays in place without requiring excessive forces be applied to strap 30. Additionally, depending upon the relative friction between the dog leg and boot 1, other devices may be used which serve to contract open end 2. Such devices are too numerous to specifically mention herein, but can include elastic materials, and even resilient and elastic fabrics commonly found in the apparel industry.

Figure 5:
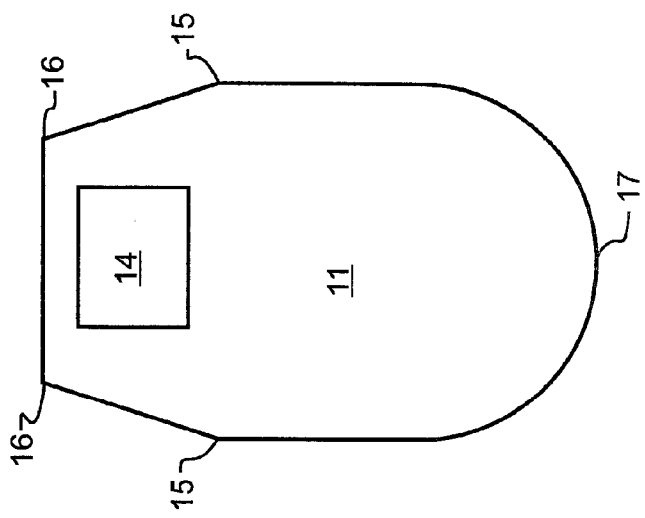
FIG. 5 illustrates the preferred embodiment canine wound boot of FIG. 4 looking at the bottom of the boot, with the top removed as though inside the boot, from a top view.

FIG. 4 illustrates boot 1 laid out flat, from a bottom view, as it will typically be after manufacture but before being placed on a dog's leg. Strap 30 extends from boot 1, rather than being in the operative, wrapped position shown in FIGS. 1 and 2. FIG. 5 illustrates boot 1 showing only bottom 10, looking at the side of bottom 10 opposed to that shown in FIG. 4. FIG. 5 shows the relative size and placement of cushioning pad 14. FIG. 5 also illustrates the overall shape and geometry of bottom 10, which is that generally of a rectangle, but with two significant changes. First, adjacent closed end 3, the ninety degree corners that would be found in a standard rectangle have been chamfered, to yield a relatively rounded toe end 17. Those skilled in the art will recognize that the final amount of chamfer or other shaping will depend upon the paw print for which the boot 1 is intended. A good universal shape is the gradual arc formed by extensive chamfer as shown in the present figures.

Opposite to toe end 17 there is a flare which begins at points 15 and narrows with increasing distance from toe end 17 and closed end 3 to the end points 16. In contrast, the top and front 20 has an opposite flare which widens with increasing distance from toe end 17 and closed end 3 to the end points 26, and also includes the chamfer adjacent closed end 3 which forms rounded toe end 27. Cushion 24 will still most preferably be placed adjacent to strap 30, but will, like pad 14, not extend the full width of the rectangular shape of top and front 20.

Boot 1 consists of both top and front 20 and bottom 10. Coupling them together are generally elastic panels 40. These act as a gusset that can expand to allow the boot to cover a bandage, cast or other obstacle that may be used to treat a canine paw or foot. While a variety of materials may be suitable, a nylon fabric with elasticity, such as one containing Lycra™ or similar material, is preferred. In the preferred embodiment, the top and front 20, bottom 10 and elastic panels 40 are assembled by stitching at a perimeter therebetween, though many other known manufacturing equivalents exist and are contemplated herein, including for exemplary purposes only and not limited thereto, thermal bonding, chemical bonding, and adhesive bonding. Rather than stitching the entire perimeter, which would fully close boot 1, stitching will stop at points 15, and not extend beyond towards points 16. This means that two opposed slits have been formed adjacent points 16, most preferably in the region over which straps 30, 40 travel. The slits thus formed provide overlap without bunching, and the fact that cushions 14, 24 do not form an entire circumference means that strap 30 may be tightened about a wider range of dog legs without any fear of bunching than was possible in the prior art. Yet, and as aforementioned, cushions 14, 24 will ensure good contact with a dog's leg. The shapes illustrated in FIGS. 4-7 also allow boot 1 to easily slip onto a dog's foot, as the opening is quite wide at the top of the boot when the slits are opened.

By using closed cell foam for pads 14, 24, boot 1 has the ability to float in water, which is an advantage when a boot comes off the dog in water. Unfortunately, the effects of water, muck and the like may still exert forces that are greater than the boot can otherwise resist. Hook and loop fasteners or a similar product are used to make up the fastening system comprised by strap 30. Strap 30 is a simple hook and loop fastening system preferably placed near the top of boot 1. The combination of pads 14, 24 with strap 30 additionally allows less tension to be used to keep boot 1 on than in the prior art. This is advantageous particularly in those instances where circulation is compromised, or where optimal circulation is vital for proper healing. FIG. 6 illustrates the hook portion 31 of strap 30 and the loop portion 32 which are designed to inter-engage and fasten together, though it will be understood that these arrangements of hooks and loops are not critical to performance.

As may be understood, these preferred embodiment booties have many uses, but are most preferable for the provision of protective covering over a wound, whether otherwise unprotected, bandaged, or otherwise. Additionally, while the preferred embodiment describes application to dogs in accord with the requirement for enablement, those skilled in animal husbandry will recognize that the present invention will have application to other animals having similar paw and leg anatomy. Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A canine wound boot, suitable for insertion and removal of a dog's leg and paw and providing an operatively protective covering about said dog paw, comprising:
   a generally tubular body member fabricated from a laminate material having first and second layers spaced apart by fibers bonded at said first layer and said fibers each extending longitudinally from said first layer to said second layer and bonded to said second layer, said generally tubular body member having a closed end and an open end and defining a dog paw region operative to surround said dog's paw and a dog leg region operative to surround said dog's leg;
   a means for contracting said dog leg region; and
   at least one cushion on an interior of said dog leg region protruding interiorly from said generally tubular body member above and immediately adjacent to said dog paw region by an amount of protrusion when said contracting means is contracted about said dog leg region to produce interference with said dog's paw and thereby prevent said dog leg region from sliding into contact with said dog's paw.

2. The canine wound boot of claim 1, wherein said contracting means further comprises at least one releasable strap.

3. The canine wound boot of claim 1, wherein said generally tubular body member further comprises an elastic panel longitudinally extensive with a longitudinal axis of said generally tubular body member and coupled with opposed edges of said laminate material to form a tube therewith.

4. The canine wound boot of claim 1, wherein said contracting means defines a contracted circumference, and said at least one cushion is within said contracted circumference.

5. A canine wound boot, suitable for insertion and removal of a dog's leg and paw and providing an operatively protective covering about said dog paw, comprising:
   a generally tubular body member fabricated from a laminate material having first and second layers spaced apart by fibers bonded at said first layer and said fibers each extending longitudinally from said first layer to said second layer and bonded to said second layer, said generally tubular body member having a closed end and an open end and defining a dog paw region operative to surround said dog's paw and a dog leg region operative to surround said dog's leg;
   a means for contracting said dog leg region;
   at least one cushion on an interior of said dog leg region protruding interiorly from said generally tubular body member above and immediately adjacent to said dog paw region by an amount of protrusion when said contracting means is contracted about said dog leg region to produce interference with said dog's paw and thereby prevent said dog leg region from sliding into contact with said dog's paw; and
   at least one slit in said generally tubular body extending from said open end towards said closed end, said generally tubular body overlapping upon itself at said slit and terminating prior to overlapping with said at least one cushion when said open end is operatively contracted.

6. The canine wound boot of claim 5, wherein said contracting means further comprises at least one releasable strap.

7. The canine wound boot of claim 5, wherein said generally tubular body member further comprises an elastic panel longitudinally extensive with a longitudinal axis of said generally tubular body member and coupled with opposed edges of said laminate material to form a tube therewith.

8. The canine wound boot of claim 5, wherein said contracting means defines a contracted circumference, and said at least one cushion is within said contracted circumference.

9. The canine wound boot of claim 5, wherein said at least one slit further comprises two opposed slits and said at least one cushion further comprises two opposed cushions, said two opposed cushions interposed between said two opposed slits within a circumference defined by said contracting means, while only partially circumscribing said circumference so a first one of said two opposed cushions does not overlap with a second one of said two opposed cushions when said tensioning means is operatively tensioned about said dog's leg.

10. The canine wound boot of claim 9, wherein said two opposed slits generally narrow with decreasing distance from said closed end when fully opened.

11. The canine wound boot of claim 5, wherein said at least one interference-producing cushion further comprises a termination distal to said open end, said at least one interference-producing cushion located entirely within said dog leg region.

12. The canine wound boot of claim 5, wherein said at least one interference-producing cushion further comprises a tapered edge most nearly adjacent to said open end which slopes simultaneously away from said open end and away from said operatively protective covering, thereby facilitating insertion of a dog's paw into said dog boot.

13. The canine wound boot of claim 5, wherein said at least one interference-producing cushion further comprises a foam pad.

14. The canine wound boot of claim 5, wherein said at least one interference-producing cushion further comprises elastic material.

15. The canine wound boot of claim 5, wherein said generally tubular body member further comprises an antimicrobial.

\* \* \* \* \*